United States Patent Office 3,475,964
Patented Nov. 4, 1969

3,475,964
LIQUID INJECTION DEVICE
Anthony Jenkins, Cambridge, England, assignor to W. G. Pye & Co. Ltd., Cambridge, England, a British company
Filed Sept. 20, 1967, Ser. No. 669,000
Claims priority, application Great Britain, Sept. 26, 1966, 42,924/66
Int. Cl. G01n *1/00;* B01d *15/08*
U.S. Cl. 73—422         7 Claims

ABSTRACT OF THE DISCLOSURE

A liquid injection device for injecting an amount of sample liquid into a chromatograph column wherein the liquid is contained within a sample vessel which is connected to the column by a tube which extends at one end into the vessel and at its other end into the column. Means are provided for normally maintaining the pressure in the sample vessel at the pressure acting on the column, as well as a changeover valve which, when operated, applies to the sample vessel a gas from a predetermined volume and at a higher pressure than the pressure acting on the column so as to displace liquid from the sample vessel through the tube into the column.

---

The present invention relates to a liquid injection device for injecting an amount of sample liquid into a chromatograph column.

It is an object of this invention to provide means for injecting a chosen amount of a sample liquid into a chromatograph column without the sample coming into contact with any valve members or the like.

According to the present invention the liquid is contained within a sample vessel which is connected to the column by a tube which extends at one end into the vessel and at its other end into the column, the sample vessel being disposed below the end of the tube in the column, means for normally maintaining the pressure in the sample vessel at the pressure acting on the column, and a changeover valve which when operated applies a gas from a predetermined volume and at a higher pressure than the pressure acting on the column to the sample vessel to displace liquid from the sample vessel through the tube into the column. The arrangement may be such that when the changeover valve is returned to its initial position any sample liquid remaining in the tube siphons back from the line connecting the column to the sample vessel. Alternatively such liquid may be drawn back into the sample vessel by means of suction.

The sample vessel may be normally maintained at the pressure acting on the column by means of a connection from the column gas supply, through the changeover valve in its normal position, to the sample vessel. In this position of the changeover valve, the gas supply at higher pressure is also connected through the changeover valve to a container of predetermined volume. When the changeover valve is operated, the connection from the column gas supply to the vessel is broken and the vessel is connected to the gas at higher pressure in the container, whereby liquid is displaced from the vessel to the column, the volume of liquid displaced depending on the volume of the container and the difference between the two gas pressures. Preferably the changeover valve is pneumatically operated.

The invention will now be further described, by way of example, with reference to the accompanying drawings, in which.

Figure 1:
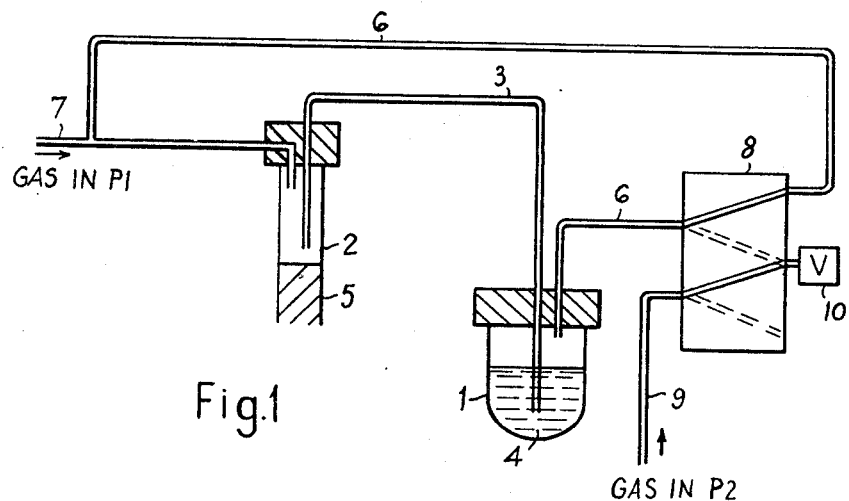
FIGURE 1 is a diagram showing one embodiment of liquid injection device.

Referring to FIGURE 1, a sample vessel 1 is connected to a chromatograph column 2 by a tube 3 which has one end immersed in a sample liquid 4 in the vessel and its other end terminating above the column packing 5. The pressure in vessel 1 is normally maintained at column pressure $P_1$ by a gas line 6 connecting the sample vessel 1 to the carrier gas line 7 before the column. This connection is made via a pneumatically operated changeover valve 8. The sample vessel is always maintained below the end of the tube 3 in the column and in this position the siphoning pressure acting on the two ends of the tube 3 ensures that no sample liquid passes into the column. A second gas supply is connected through the gas line 9 to the changeover valve 8 as shown. This gas is the same as the carrier gas but at a higher pressure, $P_2$ say. In the normal positon, the pressure $P_2$ is fed to a container 10 of volume V.

When the changeover valve 8 is actuated, the gas line 6 connecting the sample vessel to the column gas line 7 is disconnected and the sample vessel is connected to the volume V, of higher pressure gas. The gas expands into the vessel and displaces a liquid sample on to the column. The volume of liquid sampled is dependent on $P_2-P_1$, V, and the volume of the tube 3 connecting the sample vessel to the column. Since V, $P_1$ and the volume of the tube will normally be held constant, the amount of liquid sampled may be varied by changing the pressure $P_2$. When all the above parameters are maintained constant, a reproducible sample is obtained.

When the valve 8 is returned to the normal position, the gas connection 6 is again established between the sample vessel and the column gas line 7. The sample liquid remaining in the tube 3 siphons back into the sample vessel 1 and since any changes of pressure will act equally in both the column and sample vessel, no injection will be caused by changes of pressure during either temperature or flow changes on the column.

Figure 2:
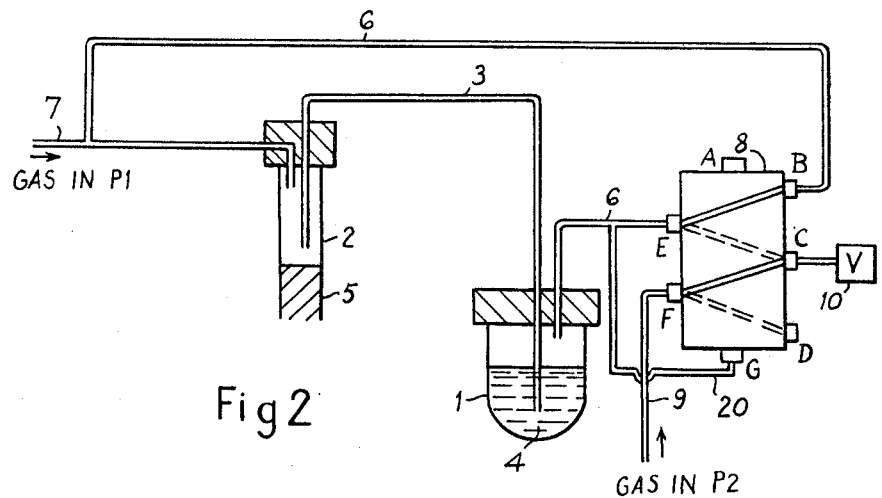
FIGURE 2 is a diagram of a further embodiment.

FIGURE 2 shows a further embodiment, generally similar to FIGURE 1, but wherein the sample liquid remaining in the tube 3 is withdrawn from the tube 3 by means of suction. This ensures that no droplets of sample are allowed to remain on the end of tube 3 within the column.

The necessary suction is applied to the gas line 6 through line 20 connected to the valve 8, the suction being created upon the return of the valve 8 from its actuated position to its normal position.

Figure 3:
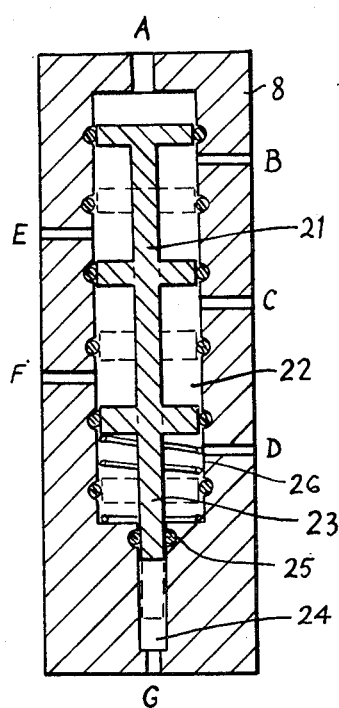
FIGURE 3 is a cross-section through the valve used in the embodiment of FIGURE 2.

The construction of the valve 8 for this embodiment is shown in FIGURE 3. The ports A, B, C, D, E, F and G are connected to the various parts of the apparatus as shown in FIGURE 2. The valve comprises a spool 21 slidable within the cylinder 22 and providing the necessary coupling between the various ports. When the valve is in its rest or normal position, the spool is in the full line position. When pneumatic pressure is applied through port A to actuate the valve, the spool 21 moves to the dotted line position against the action of spring 26, and thereby interconnects the ports such that a sample can be injected on to the column, as described previously.

It will be noted that the spool 21 is provided with an extension 23 which slides within an auxiliary cylinder 24 and is sealed by a sealing member 25. When the pneumatic pressure is removed at the end of the sample injection period to allow the valve to return to its normal position, the upward movement of extension 23 in cylinder 24 causes a reduction in pressure in that cylinder which is applied via port G and line 20 to the line 6, and hence to the vessel 1 and acts to draw back into the vessel 1 the sample liquid remaining in the line 3.

I claim:
1. A liquid injection device for injecting an amount of a sample liquid into a chromatograph column, comprising:
   a first tube for supplying a carrier gas under pressure to the column,
   a sample vessel for containing a liquid sample,
   a second tube extending from within the sample vessel to the column,
   a changeover valve,
   a third tube connected from the first tube to the changeover valve,
   a fourth tube connected from the changeover valve to the sample vessel and which is connected to the third tube in one position of the changeover valve so as to maintain the pressure in the sample vessel at the pressure acting on the column,
   a container for containing a predetermined volume of gas,
   means for supplying gas, at a higher pressure than the gas acting on said column, to said container through said changeover valve when said valve is in said one position, and
   means for supplying said predetermined volume of gas from said container to said sample vessel through said fourth tube, when said changeover valve is moved to it other position, thereby displacing liquid from said sample vessel through said second tube into the column.

2. A device as claimed in claim 1, wherein the sample vessel is disposed below the end of the second tube in the column whereby, when the changeover valve is returned to its one position after injecting a sample into the column, the liquid remaining in said second tube siphons back into the sample vessel.

3. A device as claimed in claim 1, including means for producing suction and means for applying said suction to said fourth tube to withdraw liquid remaining in said second tube back into the sample vessel after injecting a sample into the column.

4. A device as claimed in claim 3, wherein the suction is produced by the operation of the changeover valve as it returns from its other position to its one position.

5. A device as claimed in claim 4, wherein the changeover valve includes a cylinder connected to said fourth tube and a piston movable in said cylinder to produce the suction.

6. A device as claimed in claim 1, including pneumatic means for operating the changeover valve.

7. A device as claimed in claim 1, wherein said carrier gas supplied to the column and said gas at a higher pressure are the same kind of gas.

References Cited
UNITED STATES PATENTS

| | | | |
|---|---|---|---|
| 3,041,869 | 6/1962 | Spracklen et al. | 73—422 |
| 3,385,473 | 5/1968 | Forcesi | 137—209 |
| 3,365,951 | 1/1968 | Jentzsch et al. | 73—422 |

S. CLEMENT SWISHER, Primary Examiner

U.S. Cl. X.R.

55—197